INVENTORS
Louis J. King.
Ronald M. King

BY *Van Valkenburgh & Lowe*

ATTORNEYS

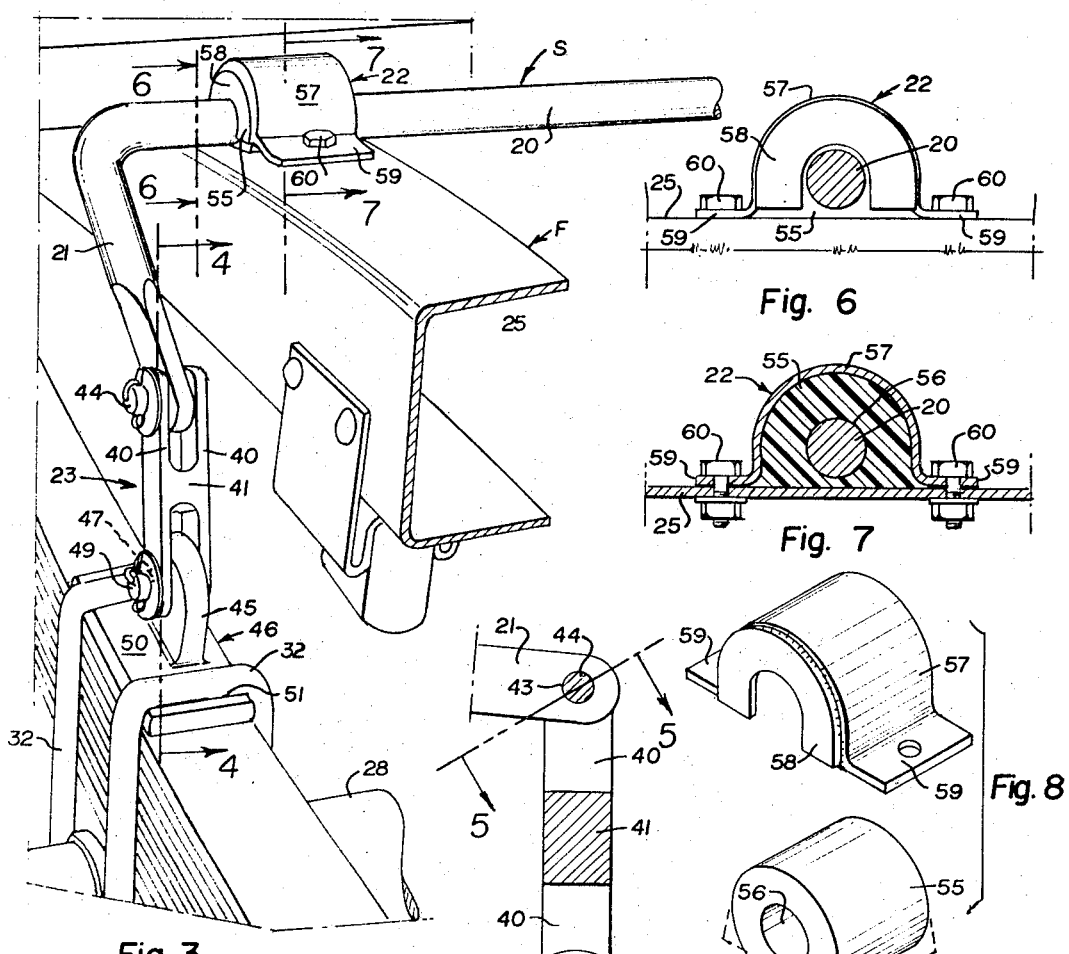

United States Patent Office 3,448,994
Patented June 10, 1969

3,448,994
SWAYBAR FOR VEHICLES
Louis J. King, Denver, and Ronald M. King, Arvada,
Colo., assignors to Denver Spring Service, Inc., Denver,
Colo., a corporation of Colorado
Filed Oct. 26, 1966, Ser. No. 589,709
Int. Cl. B60g 11/04, 11/12
U.S. Cl. 280—124                 4 Claims

ABSTRACT OF THE DISCLOSURE

A swaybar stabilizer assembly for a vehicle of the type having a horizontal, longitudinally-disposed frame spring-supported upon and over a wider transverse axle, including a torsion bar in the form of a wide-base U with the length of the base exceeding the width of a frame and with shorter parallel arm portions turning from each end of the base portion, a pair of spaced bearings on the torsion bar base mounted transversely on the frame and rearwardly of the axle housing to hold the base across the frame at a position where the ends of the arms are no further forwardly than a position over the axle housing when the base is twisted to position the arm substantially horizontally, and a link which pivotally depends from the outstanding end of each horizontally disposed arm and is pivotally connected to the axle.

---

This invention relates to stabilizers for motor vehicles and more particularly to lateral torsion bar stabilizers to inhibit the side sway of a vehicle. As such the invention will be hereinafter called a "swaybar stabilizer" or simply a "swaybar."

The body of an ordinary automobile or truck is spring mounted upon the rear wheel axles in such a manner to permit the wheels to oscillate or bounce. While the axles are spring mounted to provide a smooth ride over chuck holes and surface irregularities, problems arise when the vehicle is turning and on a curve because the centrifugal action of the vehicle causes the springs at one side of the body to be depressed and permit the body to lean or tip sidewise. Then the center of gravity of the vehicle moves outwardly of the curve to cause further tipping of the vehicle body. This side tipping, swaying action is especially undesirable in trucks having a high body and especially in campers where passengers may be riding, and to minimize the side sway action many of these vehicles are equipped with swaybar stabilizers.

These bars mounted across the rear portion of the body frame are linked with the rear axle, at both sides of the vehicle, adjacent to the springs in such a manner as to force the springs at both sides of the vehicle to move more nearly in unison when side tipping of the body commences. A swaybar should be designed to permit the wheel system to oscillate freely under normal operation of the vehicle so that the rear wheels of the vehicle may bounce on rough roads and the spring system can deflect when the body is heavily loaded. At the same time, the swaybar must impart a substantial resistance against excessive uneven deflection of the springs caused by the body tipping as when a vehicle rounds a curve. Further, the connection of the swaybar to the body and to the axle should be snug and tight and substantially wear-free since any slackness in the swaybar can cause noise and jerking. The swaybars now available do not fully meet these requirements especially a requirement that they remain snugly fitted and not wear to the point of becoming loose. The present invention was conceived and developed with the above and other considerations in view and comprises, in essence, a simple mounting of a swaybar upon a vehicle frame with the arms of the swaybar being connected to the axle by a simple, easily installed linkage.

It follows that an object of the invention is to provide a novel and improved swaybar which is especially effective in operation and is a strong, rugged, and durable unit.

Another object of the invention is to provide a novel and improved swaybar which is especially easy to install on the frame of an automobile or truck and is installed in such a manner and at a location as not to interfere with mounting other components, such as a body section, upon the vehicle frame.

Another object of the invention is to provide a novel and improved swaybar which when installed on an automobile or truck is free to oscillate and to yield with the regular movements between the axle and the vehicle body but will strongly and resiliently resist side sway or tipping of the vehicle.

Another object of the invention is to provide, in a swaybar for a motor vehicle, a novel and simplified linkage for connecting the ends of the swaybar arms to the rear wheel axle in a manner which will produce a minimum of interference with the normal axle movements, which will be clear of other components of the vehicle structure, which will be solidly and ruggedly connected to the axles, and which will produce a minimum of wear due to bouncing and oscillation of the vehicle wheels.

Another object of the invention is to provide a novel and improved swaybar construction which is a simply-designed, neat-appearing, low-cost unit, and is easily adapted to be used with vehicles having different types of spring systems for supporting the vehicle body upon the rear wheel axles.

With the foregoing and other objects in view, all of which more fully hereinafter appear, our invention comprises certain constructions, combinations and arrangements of parts and elements as now described, defined in the appended claims, and illustrated, in preferred embodiment, in the accompanying drawing in which:

FIGURE 3 is a perspective fragmentary view of a portion of the showing at FIG. 2 but taken on an enlarged scale to better show the construction of one side of the swaybar assembly.

FIGURE 4 is a fragmentary sectional detail as taken from the indicated line 4—4 at FIG. 3 but on an enlarged scale.

FIGURE 5 is a fragmentary sectional detail as taken from the indicated line 5—5 at FIG. 4.

FIGURE 6 is a fragmentary sectional detail as taken from the indicated line 6—6 at FIG. 3 but on an enlarged scale.

FIGURE 7 is a fragmentary sectional detail as taken from the indicated line 7—7 at FIG. 3 but on an enlarged scale.

FIGURE 8 is an isometric, exploded view of certain components specifically illustrated at FIG. 6 and FIG. 7 with broken lines indicating the manner in which one of the components is distorted.

FIGURE 9 is a fragmentary perspective view similar to a portion of the showing at FIG. 2, but illustrating a modified spring system between the vehicle frame and rear axle and a modified manner of connecting the swaybar to the rear axle housing.

FIGURE 10 is a fragmentary sectional detail as taken from the indicated line 10—10 at FIG. 9 but on an enlarged scale.

Figure 1:
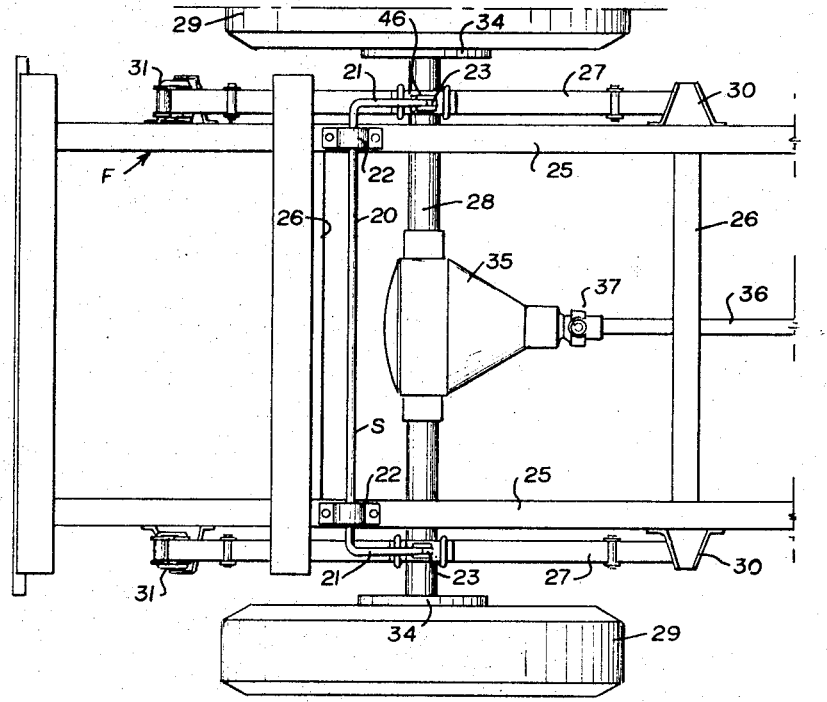
FIGURE 1 is a plan view of the rear section of a vehicle frame, illustrating the improved swaybar mounted thereon and connected to the spring above the rear axle.

Referring more particularly to the drawing, the improved swaybar S is adapted to be mounted upon the rear portion of the frame F of an ordinary vehicle such as a truck or an automobile. The swaybar S is a rodlike member formed as a wide U having a wide base 20 and comparatively short arms 21 at each side thereof. The base is connected to frame members by bearings 22 and each arm 21 is connected to one side of the rear axle by links 23.

The frame F of a conventional vehicle includes a pair of spaced, longitudinally extended beams 25, one being at each side of the vehicle. These beams 25 are held apart by transverse strut members 26 to produce a rigid structure. The vehicle motor and driver control mechanisms at the front of the vehicle are not shown in the drawing. The rear portion of the frame F is mounted upon a pair of spaced springs 27 which, in turn, are mounted upon the rear axle housing 28 which, in turn, carries the wheels 29.

Figure 2:
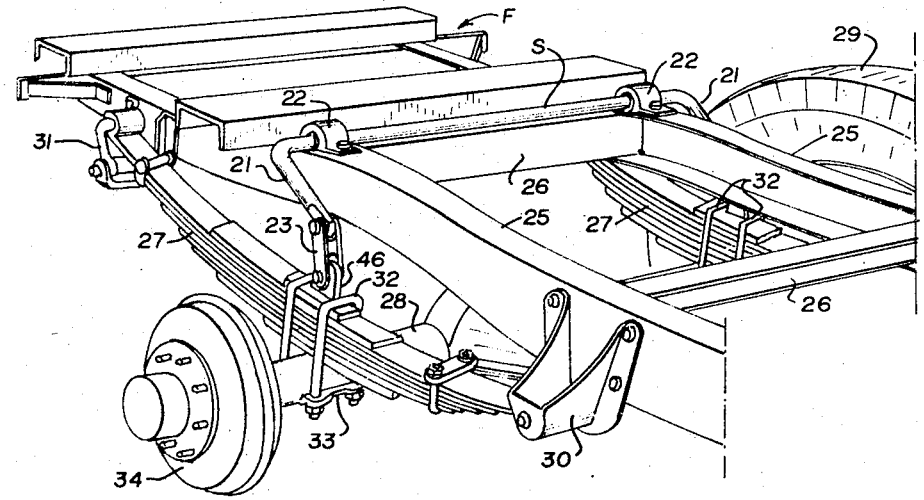
FIGURE 2 is a perspective view of the right-hand side of the rear portion of the vehicle frame with the right wheel being removed to better show the swaybar connection to the springs at the axle.

The springs may be either leaf springs 27 as shown at FIGS. 1 and 2 or coil springs 27' as shown at FIG. 9, which will be hereinafter described. In plan, each leaf spring 27 is extended alongside and outwardly of a longitudinal frame beam 25 to be carried on a conventional fixed bracket 30 at its front end and a shackle bracket 31 at its rear end. The center of each leaf spring is secured to the wheel axle housing by a pair of U-bolts 32, each embracing the spring, extending downwardly thereover and at each side of the housing to clamp onto a bracket 33 at the underside of the axle housing 28. The axle housing extends transversely across and underneath the vehicle body supporting brakes 34 and the wheels 29 at each end thereof. A differential housing 35 is located at the center of the axle housing and a propeller drive shaft 36 extends forwardly from the differential housing, including a universal joint 37 at the housing to permit a complete freedom of movement of the propeller shaft 36 with respect to the differential housing. It follows that, except for the springs 27 at either side of the vehicle, the frame F and body thereon are independent of any restraints from the axle housing. Since each spring is also substantially independent of the other, one may deflect without a like deflection of the other to produce the undesirable side sway or tipping of the frame hereinbefore mentioned. The purpose of the swaybar S is to restrict this particular freedom of movement of the springs and to more nearly force the springs to deflect in unison and minimize the side sway.

The U-shaped swaybar S is formed as a solid bar of carefully tempered spring steel or of any other high strength, elastic material. The center base section 20 is of a selected length to correspond with the lateral center line spacing of the leaf springs 27 so that each arm 21 will overlay a spring 27 at the outer side of the frame. The bearings 22 holding the base 20 are mounted upon the top of the longitudinal frame members 25 to extend the swaybar base 20 transversely across the top of the vehicle frame. Also, the bearings 22 are at a position which is a short distance rearwardly the axle housing such that the arms 21 may extend horizontally and forwardly from the base with their ends located substantially directly above the axle housing so that the links 23 connecting the ends of the arms to the rear axle are nearly or approximately vertical.

Each link 23 is formed as a narrow H-shaped member, consisting of a pair of parallel, flat side bars 40 held apart by a short, thick center bar 41. The upper end of each link is adapted to snugly embrace the outer end of an arm 21, which is flattened at its sides for a better fit between the bars 40 of the link. A bearing hole 42 extends through the upper end of each bar 40 in registration with a similar bearing hole 43 in the end of the arm 21 to permit the members to be interconnected by a pivot pin 44.

The lower end of each link is adapted to embrace an upstanding ear 45 of a T-anchor 46 affixed to the springs 27 directly above the axle housing. A bearing hole 47 extends through the lower end of each bar 40 in registration with a similar bearing hole 48 in the anchor ear 45 to permit the members to be interconnected by a pivot pin 49.

The anchor 46, a simple T-shaped member, includes a flat, elongated base 50 proportioned to lie upon the top of the leaf springs 27 and to be securely locked in position thereon by the U-bolts 32, the base 50 having a transverse notch 51 near each end to hold the crotch of a connecting U-bolt. The ear 45 upstands from the base as a longitudinally disposed flat member with the top portion curved about the bearing hole 48 to permit free swinging of the link 23 thereon. It is to be noted that the manner of connecting the anchor 46 to the top of the springs 27 between the U-bolts effectively interconnects the link 23 with an end of the axle housing directly therebelow as in the manner clearly illustrated at FIG. 2. Where a different spring system is used, as the coil spring 27' illustrated at FIG. 9, it is merely necessary to modify the anchor to connect it directly to the axle housing. As in FIG. 9, the modified arrangement will use an identical swaybar S, identical bearings 22, a slightly longer link 23', and the modified anchor 46'. This anchor 46' uses a connector ear 45 the same as hereinbefore described. A curved base 50' is formed to embrace the upper half of the axle housing 28, and it includes outstanding diametrical flanges 52. A bottom cap 53 is formed to embrace the under half of the axle housing and it includes outstanding diametrical flanges 52' to connect with flanges 52 as by bolts 54.

This basic arrangement of mounting the swaybar upon the longitudinal frame members of the vehicle directly behind the axle housing may also be accomplished by mounting the bearings 22 on the underside of the frame members as well as upon the top of the frame members as illustrated in the drawing. The arms 21 of the swaybar may extend forwardly in the same manner as heretofore described and connected to the axle housing by links as described, although in some types of vehicles where such a mounting is necessary the links will have to be shortened to keep the arms of the swaybar at a substantially horizontal position. This modification, however, does not significantly alter the basic arrangement and operation of the swaybar assembly.

It is important that the swaybar movement be biased to apply a light pressure on the linkage in a given direction to minimize slack and wear and especially to avoid clattering when driving the vehicle under normal conditions. To accomplish this function, a resilient force may be applied at the bearings 22 by forming the bearing with a rubber insert 55. Each insert, a short, thick-walled, tubular member of a rubber of moderate hardness, having a central passageway 56 to fit upon the swaybar 20, is held upon a frame member by a formed cap 57. The cap 57, a hemispherical shell, is closed at each end by a half washer 58 having a central opening through which the swaybar 20 extends. Diametrically opposing flanges 59 outstand from each end of the shell, and are bolted as by bolts 60 to the top of a frame member 25. To attain a desired degree of tightness, the cap 57 will not fully contain the insert and the insert is greatly distorted when bolted thereon, as to a form shown in broken lines at FIG. 8. Such distortion requires the bolts to be pulled into place and securely tightened.

The installing of a swaybar upon a vehicle frame, before the body or cab is mounted thereon, is a simple, quick matter. The anchors 46 are affixed to the springs 27 by the U-bolts 32 or, as in the case of the FIG. 9 construction, directly to the axle housing. The links 23 are pin-connected to the anchors and to the ends of the swaybar S. The inserts 55 are in place on the swaybar base 20 to lie upon the frame members 25 with the links 23 being substantially vertical. The caps 57 are then bolted onto the frame to complete the installation. When the vehicle cab or body is installed, the additional weight will deflect the springs a small amount causing the confined inserts 55 to be twisted by the swaybar a small amount to take up all slack in the linkage. The approximate position of the swaybar with the cab will be with the arms 21 horizontal and the links vertical. In this position a minimum of stress and wear will occur on the pins 44 and 49 as the vehicle moves in a normal manner along the highway and a most effective torsion action to resist swaying will occur on the swaybar whenever the vehicle rounds a curve. It is a simple matter to design the swaybar S with a selected diameter and arm length to operate effectively with any of a number of various sizes of vehicles.

We have now described our invention in detail. It is apparent, however, that others skilled in the art can devise and build alternate and equivalent constructions which are nevertheless within the spirit and scope of the invention. Hence, we desire that our protection be limited, not by the construction illustrated and described, but only by the proper scope of the appended claims.

We claim:

1. A swaybar stabilizer assembly for a vehicle of the type having a horizontal, longitudinally-disposed frame spring-supported upon and over a wider transverse axle and comprising:
    (a) a torsion bar in the form of a wide-base U with the length of the base exceeding the width of a frame and with shorter parallel arm portions turning from each end of the base portion;
    (b) a pair of spaced bearings on the torsion-bar base mounted transversely on the frame and rearwardly of the axle housing to hold the base across the frame at a position where the ends of the arms are substantially over the axle housing when the base is twisted to position the arms substantially horizontally;
    (c) a link pivotally depending from the outstanding end of each horizontally disposed arm;
    (d) means for pivotally connecting the lower end of each link to the axle whereby side swaying of the frame with respect to the axle, as when the vehicle rounds a curve, creates a differential movement of one arm with respect to the other;
    (e) said bearings including elastic inserts formed as short, thick-walled tubes adapted to embrace and grip the base of the swaybar and means adapted to tightly hold the inserts, to resiliently bias the rotation of the swaybar base to a selected position whereby to eliminate slack in the connections of the swaybar to the vehicle body; and
    (f) each said insert being confined within a cup-like member adapted to be tightly secured to the vehicle frame, said cup-like member being substantially in the form of a half-cylinder having diametrically-opposing, connecting flanges and washer-shaped end closures with openings to permit the swaybar rod to extend through them, the member being proportioned with respect to the insert such as to distort and tightly grip the insert when the insert is bolted against the frame.

2. In the organization defined in claim 1 wherein the vehicle frame is supported upon leaf springs with each spring being longitudinally disposed at one side of the frame and secured to the axle housing by U-bolt clamps and wherein said connection means is formed as an inverted T-shaped member having a base proportioned to be placed upon the top surface of a spring and underneath the U-bolts to be secured thereby, and an upstanding ear adapted to be pivotally connected to a link.

3. In the organization set forth in claim 1 wherein said connecting means includes a clamp adapted to embrace and grip the axle housing and an ear upstanding from the clamp adapted to be pivotally connected to a link.

4. In the organization set forth in claim 1 wherein the connecting means includes an upstanding flat ear, the link is formed as a narrow H-shaped member with one end thereof being adapted to embrace the end of the arm and the other end being adapted to embrace the ear and transverse pivot pins through each end of the link and through an end of the arm, and the ear to effect the aforesaid pivotal connections.

References Cited

UNITED STATES PATENTS

| | | | |
|---|---|---|---|
| 2,078,367 | 4/1937 | Boor | 267—11 |
| 2,901,240 | 8/1959 | Fikse | 267—11 |
| 2,176,978 | 10/1939 | Northrup | 267—11 |
| 2,155,867 | 4/1939 | McIntyre | 267—11 |
| 1,984,978 | 12/1934 | Moffitt | 267—11 X |

FOREIGN PATENTS 1,275,237  9/1961  France.

PHILIP GOODMAN, Primary Examiner.

U.S. Cl. X.R.
267—11